(12) United States Patent
Lei et al.

(10) Patent No.: US 11,619,487 B2
(45) Date of Patent: Apr. 4, 2023

(54) DAM SLOPE DEFORMATION MONITORING SYSTEM AND METHOD

(71) Applicants: China Institute of Water Resources and Hydropower Research, Beijing (CN); Peking Remote Sensing Wisdom Technology Co., LTD., Beijing (CN)

(72) Inventors: Tianjie Lei, Beijing (CN); Jing Qin, Beijing (CN); Geng Sun, Beijing (CN); Lingyun Zhao, Beijing (CN); Weiwei Wang, Beijing (CN); Li Zhang, Beijing (CN); Mingming Zhu, Beijing (CN); Lu Wang, Beijing (CN); Ruihu Yao, Beijing (CN); Xiangyu Li, Beijing (CN); Jiabao Wang, Beijing (CN); Huaidong Zhao, Beijing (CN)

(73) Assignees: CHINA INSTITUTE OF WATER RESOURCES AND HYDROPOWER RESEARCH, Beijing (CN); PEKING REMOTE SENSING WISDOM TECHNOLOGY CO., LTD., Beijing (CN)

( * ) Notice: Subject to any disclaimer, the term of this patent is extended or adjusted under 35 U.S.C. 154(b) by 289 days.

(21) Appl. No.: 16/991,389

(22) Filed: Aug. 12, 2020

(65) Prior Publication Data
US 2021/0048294 A1 Feb. 18, 2021

(30) Foreign Application Priority Data
Aug. 15, 2019 (CN) .......................... 201910769474.5

(51) Int. Cl.
| | | |
|---|---|---|
| G01B 21/32 | (2006.01) | |
| G06T 7/00 | (2017.01) | |
| B64C 39/02 | (2023.01) | |

(Continued)

(52) U.S. Cl.
CPC ............ *G01B 21/32* (2013.01); *B64C 39/024* (2013.01); *G01S 13/865* (2013.01); *G01S 13/867* (2013.01);
(Continued)

(58) Field of Classification Search
None
See application file for complete search history.

(56) References Cited

U.S. PATENT DOCUMENTS

| | | | |
|---|---|---|---|
| 2019/0064362 A1* | 2/2019 | Scott ...................... | G01S 13/865 |
| 2022/0050460 A1* | 2/2022 | Karachalios ......... | G06V 20/653 |

FOREIGN PATENT DOCUMENTS

| | | | | |
|---|---|---|---|---|
| CN | 109409406 A | * | 3/2019 | ........... G06K 9/6256 |
| CN | 109725312 A | * | 5/2019 | |
| CN | 111191880 A | * | 5/2020 | |

OTHER PUBLICATIONS

Wyllie et al., Chapter "Movement monitoring", from Chaoter 15 of Book Rock Slope Engineering, 2017, CRC Press, eBook ISBN 9781315154039, pp. 443-462.*

(Continued)

Primary Examiner — Guillermo M Rivera-Martinez
(74) Attorney, Agent, or Firm — Onello & Mello, LLP (57) ABSTRACT

A dam slope deformation monitoring system and method are provided. The monitoring system monitors an entire dam in a reservoir area by using an unmanned aerial vehicle (UAV) photogrammetry system, and determines an encrypted monitoring area (steep slope) with the relatively large deformation and a relatively large digital elevation difference; determines, in the intensive monitoring area, a first level key monitoring area with the larger deformation by using a ground-based radar interferometry measurement system; determines, in the first level key monitoring area, a second level key monitoring area with the larger deformation by using a ground-based three-dimensional lidar measurement (Continued)

system; determines, in the second level key monitoring area, a key monitoring particle with a high deformation speed by using a global navigation satellite system (GNSS). The core chip stack is used to monitor and warn the collapse process in the area where the key monitoring particles are located.

9 Claims, 2 Drawing Sheets

(51) Int. Cl.
　　　*G01S 13/86*　　(2006.01)
　　　*G06V 20/10*　　(2022.01)
(52) U.S. Cl.
　　　CPC .............. *G06T 7/97* (2017.01); *G06V 20/176* (2022.01); *B64C 2201/127* (2013.01); *G06T 2207/10044* (2013.01); *G06T 2207/30184* (2013.01)

(56) References Cited

OTHER PUBLICATIONS

Li et al., "Application of LIDAR for the Investigation and Monitoring of Geologic Hazard", EJGE vol. 22 [2017], Bund. 04, pp. 1399-1410.*

Hsiao et al., "Application of Airborne LiDAR Technology in Analyzing Sediment-Related Disasters and Effectiveness of Conservation Management in Shihmen Watershed", Journal of GeoEngineering, vol. 9, No. 2, pp. 55-73, Aug. 2014, dx.doi.org/10.6310/jog.2014.9(2).2, pp. 55-73.*

Li et al., "Susceptibility of reservoir-induced landslides and strategies for increasing the slope stability in the Three Gorges Reservoir Area: Zigui Basin as an example", 2019, Engineering Geology 261 (2019) 105279, pp. 1-20.*

* cited by examiner

DAM SLOPE DEFORMATION MONITORING SYSTEM AND METHOD

CROSS REFERENCE TO RELATED APPLICATIONS

The present application claims the benefit of priority under 35 USC 119 to Chinese patent application 201910769474.5, filed Aug. 15, 2019, the contents of which are incorporated herein by reference.

TECHNICAL FIELD

The present invention relates to the slope monitoring field, in particular to a dam slope deformation monitoring system and method.

BACKGROUND

A reservoir dam is an important infrastructure, which is an important guarantee for flood control safety, water supply, and energy security. By 2019, China has built more than 98,000 reservoir dams of various types. However, due to the construction technology, topography, climate, dam service life and other factors, more than 3,000 dams have failed. Earth-rock dams account for 89.7% of the dam failures higher than 30 meters, causing a serious loss of life and property and ecological damage to the society and people. Therefore, the safety of reservoir dam is closely related to people's lives. The dam safety monitoring can reflect an operation status of the dam in real time, and feedback the "health status" of the dam in time, which is of great significance to the protection of people's lives and property.

However, due to the limitation of monitoring means, it is still necessary to practice and test the non-destructive testing of large-scale hydraulic structures, master advanced technology and carry out non-contact monitoring of slope deformation. Especially in the dam slope deformation monitoring of hydropower station, due to the wide coverage of slope topography and the wide distribution of massive hydraulic structures, it is time-consuming and laborious to obtain topographic data and surface data by conventional methods, and it is difficult to obtain high-precision data of high and steep sections.

SUMMARY

A purpose of the present invention is to provide a dam slope deformation monitoring system and method, to realize high-precision positioning and monitoring of a collapsed area of a dam slope.

To achieve the above purpose, the present invention provides the following schemes:

A dam slope deformation monitoring system includes:

An unmanned aerial vehicle (UAV) photogrammetry system, a ground-based radar interferometry measurement system, a ground-based three-dimensional lidar measurement system, a global navigation satellite system (GNSS), a micro-core pile, and a monitoring center.

It is proposed above, the UAV photogrammetry system, the ground-based radar interferometry measurement system, the ground-based three-dimensional lidar measurement system, the GNSS, and the micro-core pile each are connected with the monitoring center in a wired or wireless manner;

The UAV photogrammetry system is configured to: conduct periodic scanning on a dam in a reservoir area at an interval of a first scanning period, obtain laser point cloud data and oblique image data of the dam in the reservoir area, and send the laser point cloud data and the oblique image data to the monitoring center;

the monitoring center is configured to fuse laser point cloud data and oblique image data of each first scanning period, generate and select a digital elevation model and a three-dimensional scene of the dam in each first scanning period, according to the digital elevation model and the three-dimensional scene of the dam in each first scanning period, an area with the deformation greater than a first preset threshold and a digital elevation difference greater than a second preset threshold as an encrypted monitoring area;

the ground-based radar interferometry measurement system is disposed in the encrypted monitoring area, and is configured to scan the encrypted monitoring area at an interval of a second scanning period to obtain InSAR data of the encrypted monitoring area, and send the InSAR data to the monitoring center;

the monitoring center is further configured to determine, according to InSAR data of each second scanning period, an area with the deformation greater than a third preset threshold in the encrypted monitoring area as a first level key monitoring area;

the ground-based three-dimensional lidar measurement system is configured to scan the first level key monitoring area at an interval of a third scanning period, obtain three-dimensional laser data of the first level key monitoring area, and send the three-dimensional laser data to the monitoring center;

the monitoring center is further configured to determine, according to three-dimensional laser data of each third scanning period, an area with the three-dimensional deformation greater than a fourth preset threshold in the first level key monitoring area as a second level key monitoring area;

the GNSS is disposed in the second level key monitoring area, and is configured to conduct scanning at an interval of a fourth scanning period, obtain three-dimensional coordinates of each monitoring particle in the second level key monitoring area, and send the three-dimensional coordinates of the monitoring particle to each monitoring center;

the monitoring center is further configured to select, according to the three-dimensional coordinates of each monitoring particle that are obtained in real time, a monitoring particle whose three-dimensional coordinate change speed is greater than a fifth preset threshold as a key monitoring particle; and the micro-core pile is disposed at the key monitoring particle, and is configured to conduct scanning at an interval of a fifth scanning period to conduct monitoring and early warning on a collapse process in an area where the key monitoring particle is located.

Optionally, the first scanning period is a day-month time scale, the second scanning period is a hour-day time scale, the third scanning period is a minute-hour time scale, the fourth scanning period is a second-minute time scale, and the fifth scanning period is a millisecond-second time scale.

Optionally, the ground-based radar interferometry measurement system includes a mobile bracket, an interferometric radar platform, an interferometric radar support base, a first drive motor, a second drive motor, and a third drive motor.

The first drive motor is fastened on the mobile bracket, and is configured to drive two driving wheels on the mobile bracket; the second drive motor is fastened on the mobile bracket, output shafts at both ends of the second drive motor are connected with the interferometric radar support base through a bearing shaft on the mobile bracket, and the second drive motor is configured to drive the interferometric radar support base to swing up and down, so as to drive the interferometric radar platform to swing up and down; and the third drive motor is fastened on the interferometric radar support base, an output shaft of the third drive motor is in shaft connection with the interferometric radar platform, and the third drive motor is configured to drive the interferometric radar platform to circumferentially rotate.

Optionally, the mobile bracket includes the two driving wheels and two driven wheels, and the two driven wheels are universal wheels.

Optionally, the UAV photogrammetry system includes a UAV monitoring terminal, a UAV platform, an airborne oblique photography camera, and an airborne lidar;

the UAV monitoring terminal is in wireless connection with all the UAV platform, the airborne oblique photography camera, and the airborne lidar; and the UAV monitoring terminal is further connected with the monitoring center.

A dam slope deformation monitoring method includes the following steps:

conducting periodic scanning on a dam in a reservoir area at an interval of a first scanning period by using an unmanned aerial vehicle (UAV) photogrammetry system, obtaining laser point cloud data and oblique image data of the dam in the reservoir area;

selecting, according to laser point cloud data and oblique image data of each first scanning period, an area with the deformation greater than a first preset threshold and a digital elevation difference greater than a second preset threshold as an encrypted monitoring area;

scanning the encrypted monitoring area at an interval of a second scanning period by using a ground-based radar interferometry measurement system to obtain InSAR data of the encrypted monitoring area;

determining, according to InSAR data of each second scanning period, an area with the deformation greater than a third preset threshold in the encrypted monitoring area as a first level key monitoring area;

scanning the first level key monitoring area at an interval of a third scanning period by using a ground-based three-dimensional lidar measurement system, and obtaining three-dimensional laser data of the first level key monitoring area;

determining, according to three-dimensional laser data of each third scanning period, an area with the three-dimensional deformation greater than a fourth preset threshold in the first level key monitoring area as a second level key monitoring area;

conducting scanning at an interval of a fourth scanning period by using a global navigation satellite system (GNSS), and obtaining three-dimensional coordinates of each monitoring particle in the second level key monitoring area;

selecting, according to the three-dimensional coordinates of each monitoring particle that are obtained in real time, a monitoring particle whose three-dimensional coordinate change speed is greater than a fifth preset threshold as a key monitoring particle; and conducting scanning at an interval of a fifth scanning period by using a micro-core pile to conduct monitoring and early warning on a collapse process in an area where the key monitoring particle is located.

Optionally, the first scanning period is a day-month time scale, the second scanning period is a hour-day time scale, the third scanning period is a minute-hour time scale, the fourth scanning period is a second-minute time scale, and the fifth scanning period is a millisecond-second time scale.

Optionally, the conducting periodic scanning on a dam in a reservoir area at an interval of a first scanning period by using a UAV photogrammetry system, and obtaining laser point cloud data and oblique image data of the dam in the reservoir area specifically includes:

conducting periodic scanning at the interval of the first scanning period by using an airborne lidar of the UAV photogrammetry system, and obtaining the laser point cloud data of the dam in the reservoir area; and conducting periodic scanning at the interval of the first scanning period by using an airborne oblique photography camera of the UAV photogrammetry system, and obtaining the oblique image data.

Optionally, the selecting, according to laser point cloud data and oblique image data of each first scanning period, an area with the deformation greater than a first preset threshold and a digital elevation difference greater than a second preset threshold as an encrypted monitoring area specifically includes:

fusing the laser point cloud data and the oblique image data of each first scanning period to generate a digital elevation model and a three-dimensional scene of the dam in the reservoir area in each first scanning period; and selecting, according to the digital elevation model and the three-dimensional scene of the dam in the reservoir area in each first scanning period, the area with the deformation greater than the first preset threshold and the digital elevation difference greater than the second preset threshold as the encrypted monitoring area.

According to specific examples provided in the present invention, the present invention discloses the following technical effects: The present invention provides a dam slope deformation monitoring system and method. The monitoring system monitors an entire dam in a reservoir area by using an unmanned aerial vehicle (UAV) photogrammetry system, and determines an area (steep slope) with the relatively large deformation and a relatively large digital elevation difference as an encrypted monitoring area; determines, in the encrypted monitoring area, an area with the larger deformation as a first level key monitoring area by using a ground-based radar interferometry measurement system; determines, in the first level key monitoring area, an area with the larger deformation as a second level key monitoring area by using a ground-based three-dimensional lidar measurement system; determines, in the second level key monitoring area, a monitoring particle with a high deformation speed as a key monitoring particle by using a global navigation satellite system (GNSS); and monitors, by using a micro-core pile, a collapse process in an area where the key monitoring particle is located. In the present invention, the UAV photogrammetry system, the ground-based radar interferometry measurement system, the ground-based three-dimensional lidar measurement system, the GNSS, and the micro-core pile are used to conduct time-seamless monitoring from slow deformation to rapid deformation and then to a collapse moment, and full-coverage monitoring from a large area to a small area and then to a particle and from a two-dimensional (the ground-based radar interferometry measurement system) to three-dimensional (the ground-based three-dimensional lidar measurement system) spatial change. In this way, the precise positioning and space-air-ground integrated monitoring and early warning of a collapsed area of the entire dam in the reservoir area can be realized.

BRIEF DESCRIPTION OF DRAWINGS

To describe the schemes in examples of the present invention or the prior art more clearly, the following briefly describes the accompanying drawings required in the examples. Apparently, the accompanying drawings in the following description show some examples of the present invention, and a person of ordinary skill in the art may still derive other drawings from these accompanying drawings without creative efforts.

DETAILED DESCRIPTION

An objective of the present invention is to provide a dam slope deformation monitoring system and method, to realize the high-precision positioning and monitoring of a collapsed part of a dam slope.

To make the foregoing objectives, features, and advantages of the present invention clearer and more comprehensible, the present invention is further described in detail below with reference to the accompanying drawings and specific examples.

The combination of technologies such as a micro-core pile, a Beidou navigation satellite system, an interferometric radar platform, a lidar, UAV oblique photography, and a robot with big data processing, artificial intelligence, automatic monitoring, and other methods has been increasingly widely used in monitoring and early warning of a river basin environment, ecology, and dam and reservoir safety, and has great application prospects in the monitoring precision, reliability, safety, etc. A ground-based radar interferometry measurement system is based on principles of synthetic aperture radar (SAR) and interferometric radar (D-InSAR), and can extract displacement information of small deformation from a wide-range observation scene. It is mainly used for real-time displacement monitoring of a ground surface, can conduct all-day and all-weather (24 hours and all weather conditions), wide-range (full coverage within a few kilometers), high-precision (submillimeter monitoring precision) automatic monitoring in real time, and has been widely applied in roads, railways, landslides, and the mining industry. Compared with conventional monitoring means (precision leveling, optical fiber sensors, GPS, close-range photogrammetry, etc.), this technology has advantages of wide monitoring range, high monitoring precision, low costs, etc. The comparison between advantages and disadvantages of various monitoring means is shown in Table 1.

TABLE 1

| Method | Advantages and disadvantages | Application range |
|---|---|---|
| UAV remote sensing photography method | It has a large amount of monitoring information, is labor saving and safe, can be implemented fast, but has relatively low monitoring precision at a centimeter level | It is suitable for monitoring three-dimensional displacement of a slope with a relatively high deformation rate in a large area, and changes of dangerous rocks, steep walls, and cracks. It is greatly affected by climatic conditions |
| GNSS differential positioning measurement method | It has high precision and easy operation, can be implemented fast, can implement all-weather observation without being restricted by a terrain visibility condition, and has a short monitoring period and a high monitoring speed. Currently, it has relatively low costs and has the monitoring precision at a millimeter level | It can obtain only deformation information of a feature point, and is suitable for monitoring three-dimensional displacement of a ground surface of a slope body at different deformation stages |
| Ground-based interferometric radar scanning method | It has high precision and easy operation, can be implemented fast, can implement all-weather observation but is restricted by a terrain visibility condition, and has a short monitoring period and a high monitoring speed. Currently, it has relatively low costs and has the monitoring precision at a millimeter level | It is suitable for monitoring two-dimensional displacement of a ground surface of a slope body in a wide-range area at different deformation stages, and monitoring deformation rates at different stages in a line-of-sight direction |
| Three-dimensional lidar scanning method | It has high precision and easy operation, can be implemented fast, can implement all-weather observation but is restricted by a terrain visibility condition, and has a short monitoring period and a high monitoring speed. Currently, it has relatively low costs and has the monitoring precision at a millimeter-centimeter level | It is suitable for monitoring three-dimensional displacement of a ground surface of a slope body in a wide-range area at different deformation stages |

Figure 1:
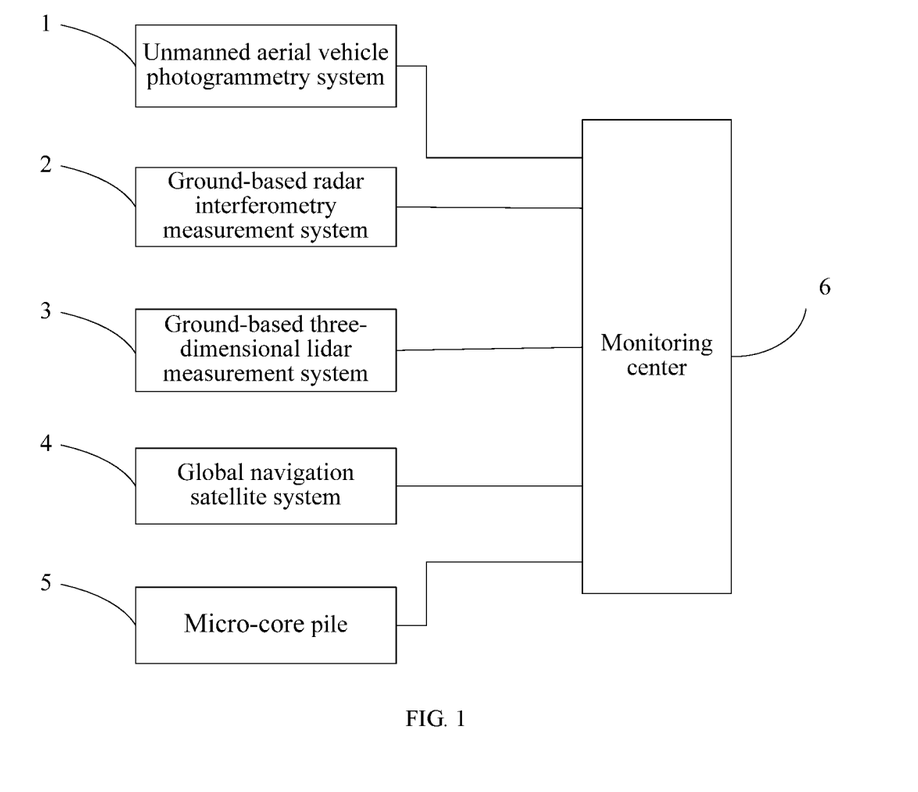
FIG. 1 is a structural diagram of a dam slope deformation monitoring system according to the present invention.

As shown in FIG. 1, the present invention provides a dam slope deformation monitoring system, where the monitoring system includes:

a UAV photogrammetry system 1, a ground-based radar interferometry measurement system 2, a ground-based three-dimensional lidar measurement system 3, a GNSS 4, a micro-core pile 5, and a monitoring center 6.

The UAV photogrammetry system 1, the ground-based radar interferometry measurement system 2, the ground-based three-dimensional lidar measurement system 3, the GNSS 4, and the micro-core pile 5 each are connected with the monitoring center 6 in a wired or wireless manner.

The UAV photogrammetry system 1 is configured to: conduct periodic scanning on a dam in a reservoir area at an interval of a first scanning period, obtain laser point cloud data and oblique image data of the dam in the reservoir area, and send the laser-point cloud data and the oblique image data to the monitoring center 6. The monitoring center 6 is configured to fuse laser point cloud data and oblique image data of each first scanning period to generate a digital elevation model and a three-dimensional scene of the dam in the reservoir area in each first scanning period, and select, according to the digital elevation model and the three-dimensional scene of the dam in the reservoir area in each first scanning period, an area with the deformation greater than a first preset threshold and a digital elevation difference greater than a second preset threshold as an encrypted monitoring area.

Aerial photography is conducted on the dam in the reservoir area by using a UAV photogrammetry technology, to mainly obtain an area with large deformation and a relatively high deformation speed (with the deformation greater than the first preset threshold) in a wide range of a monitoring reservoir area, three-dimensional displacement of a slope, and an area with dangerous rocks, steep walls, and cracks (an area with a digital elevation difference greater than the second preset threshold).

The UAV photogrammetry system 1 includes a UAV monitoring terminal, a UAV platform, an airborne oblique photography camera, and an airborne lidar, where the UAV monitoring terminal is in wireless connection with all the UAV platform, the airborne oblique photography camera, and the airborne lidar; and the UAV monitoring terminal is further connected with the monitoring center 6.

The UAV photogrammetry system 1 is equipped with the airborne oblique photography camera and the airborne lidar on the UAV platform, and conducts data processing by using point cloud processing software and a large amount of laser point cloud data obtained by using the UAV photogrammetry technology, to quickly separate ground point data from the point cloud data according to abundant filtering algorithms; and then creates a digital elevation model (DEM) based on the ground points. Then, the monitoring center 6 conducts scientific division on photographed areas after obtaining a corresponding oblique image through UAV aerial photography, and acquires and extracts information data from each area as needed; and then the monitoring center 6 completes a production process by using professional graphics software. In this case, the UAV photogrammetry system 1 further needs to conduct orthorectification, that is, correct the received original oblique image to make it have clarity required for application research. Finally, after completing the production of an orthoimage, the UAV photogrammetry system 1 continues to conduct corresponding operation steps such as mosaicing and cropping on the image. The oblique photography camera obtains multi-angle remote sensing images of a ground surface of a monitoring area. Fast stitching processing and high-precision geographic coordinate mosaicing are conducted on the remote sensing images to obtain a high-precision DEM and a three-dimensional scene. Specifically, while observing slope deformation, the monitoring center 6 fuses, on an ArcGIS platform by using UAV data modeling professional processing software (such as PIX4), the laser point cloud data and oblique image data that are obtained through UAV aerial photography, to generate a digital elevation models and a three-dimensional scene. Through the comparison of multi-temporal three-dimensional scenes and DEMs, three-dimensional changes of the ground surface in different areas or places at a same time interval are obtained.

The ground-based radar interferometry measurement system 2 is disposed in the encrypted monitoring area, and is configured to scan the encrypted monitoring area at an interval of a second scanning period to obtain InSAR data of the encrypted monitoring area, and send the InSAR data to the monitoring center 6. The monitoring center 6 is further configured to determine, according to InSAR data of each second scanning period, an area with the deformation greater than a third preset threshold in the encrypted monitoring area as a first level key monitoring area.

A slow deformation stage of a slope is monitored by using a ground-based radar interferometry technology (GB-InSAR). First, an appropriate site location of a GB-InSAR monitoring station is selected, and it is ensured that the location of the monitoring station should maintain visibility to a monitoring target, keep away from an electromagnetic interference area, a lightning strike area, and an unstable area of a geological structure, and facilitate access to a public communications network and connection to a safe and reliable alternating current power supply. After the site selection of the monitoring station is completed, the equipment starts to be run and debugged. The GB-InSAR equipment can implement 24-hour all-weather monitoring with a coverage area of 5 $km^2$. The measurement time per track is 6 min, and each image can be used to obtain millions of monitoring points and a range resolution thereof reaches 0.2 m.

By using the ground-based radar interferometry technology, a two-dimensional displacement change of a ground surface of a slope body in a wide-range area at a slow deformation stage can be obtained, and deformation rates at different stages in a line-of-sight direction are monitored.

The ground-based radar interferometry measurement system 2 includes a mobile bracket, an interferometric radar platform, an interferometric radar support base, a first drive motor, a second drive motor, and a third drive motor, where the first drive motor is fastened on the mobile bracket, and is configured to drive two driving wheels on the mobile bracket; the second drive motor is fastened on the mobile bracket, output shafts at both ends of the second drive motor are connected with the interferometric radar support base through a bearing shaft on the mobile bracket, and the second drive motor is configured to drive the interferometric radar support base to swing up and down, so as to drive the interferometric radar platform to swing up and down; and the third drive motor is fastened on the interferometric radar support base, an output shaft of the third drive motor is in shaft connection with the interferometric radar platform, and the third drive motor is configured to drive the interferometric radar platform to circumferentially rotate. The mobile bracket includes the two driving wheels and two driven wheels, and the two driven wheels are universal wheels.

The ground-based radar interferometry measurement system 2 in the present invention can further be moved on a slide rail to scan the encrypted monitoring area. In this case, the driving wheels and the driven wheels on the mobile bracket are all stuck on guide rails on both sides of the slide rail.

The ground-based three-dimensional lidar measurement system 3 is configured to scan the first level key monitoring area at an interval of a third scanning period, obtain three-dimensional laser data of the first level key monitoring area, and send the three-dimensional laser data to the monitoring center 6. The monitoring center 6 is further configured to determine, according to three-dimensional laser data of each third scanning period, an area with the three-dimensional deformation greater than a fourth preset threshold in the first level key monitoring area as a second level key monitoring area.

The GNSS 4 is disposed in the second level key monitoring area, and is configured to conduct scanning at an interval of a fourth scanning period, obtain three-dimensional coordinates of each monitoring particle in the second level key monitoring area, and send the three-dimensional coordinates of each monitoring particle to the monitoring center 6. The monitoring center 6 is further configured to select, according to the three-dimensional coordinates of each monitoring particle that are obtained in real time, a monitoring particle whose three-dimensional coordinate change speed is greater than a fifth preset threshold as a key monitoring particle.

The micro-core pile 5 is disposed at the key monitoring particle, and is configured to conduct scanning at an interval of a fifth scanning period to conduct monitoring and early warning on a collapse process in an area where the key monitoring particle is located.

As a slope disaster early warning and monitoring system, a micro-core pile or a micro-core ball has a main feature of capable of implementing simultaneous and regular monitoring of multiple indicators, proactively monitoring whether an allowed value is exceeded, predicting whether an allowed value is exceeded, miniaturization, low power consumption, remote real-time monitoring, and other functions. First, a micro-core pile or a micro-core ball is disposed at a key monitoring particle that is in a monitored slope area and at which there is relatively large deformation and collapse is prone to occur, where a battery used in the micro-core pile or the micro-core ball is a 1000-5000 mvh lithium battery with service life approximately 5-10 years. Then, the micro-core pile is used to acquire data that can be monitored by the micro-core pile, such as deformation, relative deformation, a sudden seepage change, and vibration of a slope in the monitored area. After the data acquisition is completed, the data is transmitted to the monitoring center 6. Finally, through the analysis of the data in the monitoring center, if the data falls within in a relative value range, no warning is provided. If the data exceeds a certain range, an early warning is generated. When the ground-based radar interferometry technology and a ground-based three-dimensional laser scanning technology are used in combination, a method for monitoring a key position of a slop and a slop area prone to collapse by using a micro-core pile or a micro-core ball is established, so as to more clearly and vividly observe a position and the deformation of a slop area prone to collapse.

In the present invention, the monitoring center 6 further uploads, to a server, data obtained by the UAV photogrammetry system 1, the ground-based radar interferometry measurement system 2, the ground-based three-dimensional lidar measurement system 3, the GNSS, and the micro-core pile; all acquired data is managed by using a database established in the server; and a final observation result can be displayed in real time by using multiple clients. The clients can not only display a digital elevation model of the slope monitoring area and an orthoimage that is obtained by fusion of data acquired by the UAV and data acquired by the ground-based radar interferometry measurement system, and can also display the omnidirectional deformation of the slope monitored by the ground-based radar interferometry measurement system 2.

In the present invention, the first scanning period is a day-month time scale (one day to any number of days of one month), the second scanning period is a hour-day time scale (any value in one hour to 24 hours), the third scanning period is a minute-hour time scale (one minute to any number of minutes of one hour), the fourth scanning period is a second-minute time scale (one second to any number of seconds of one minute), and the fifth scanning period is a millisecond-second time scale (one millisecond to any number of milliseconds of one second). In this way, the time seamless monitoring of the dam in the reservoir area from the long-period monitoring of slow deformation to the short-period monitoring of rapid deformation and then to the real-time monitoring of a collapse moment can be realized.

The first level key monitoring area is an area with relatively large deformation that is obtained by monitoring the encrypted monitoring area, and the ground-based three-dimensional lidar measurement system needs to be disposed for key monitoring of the area. The second level key monitoring area is an area with larger deformation that is obtained by monitoring the first level key monitoring area, and the GNSS needs to be additionally disposed in the area to determine a key monitoring particle at which there may be a danger of collapse.

Figure 2:
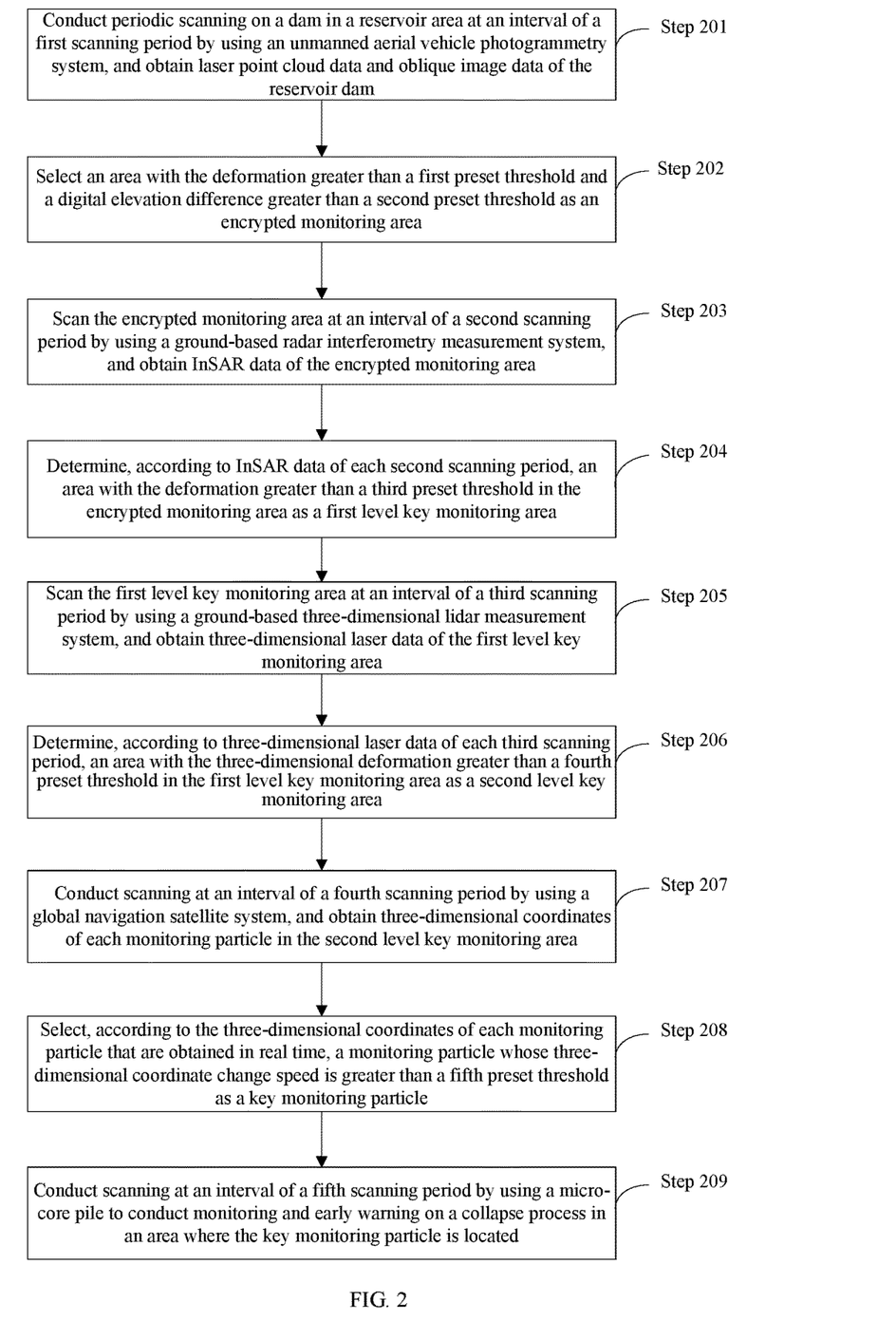
FIG. 2 is a flowchart of a dam slope deformation monitoring method according to the present invention.

As shown in FIG. 2, the present invention further provides a dam slope deformation monitoring method, where the monitoring method includes the following steps:

Step 201. Conduct periodic scanning on a dam in a reservoir area at an interval of a first scanning period by using a UAV photogrammetry system, and obtain laser point cloud data and oblique image data of the dam in the reservoir area.

Step 202. Select, according to laser point cloud data and oblique image data of each first scanning period, an area with the deformation greater than a first preset threshold and a digital elevation difference greater than a second preset threshold as an encrypted monitoring area.

Step 203. Scan the encrypted monitoring area at an interval of a second scanning period by using a ground-based radar interferometry measurement system, and obtain InSAR data of the encrypted monitoring area.

Step 204. Determine, according to InSAR data of each second scanning period, an area with the deformation greater than a third preset threshold in the encrypted monitoring area as a first level key monitoring area.

Step 205. Scan the first level key monitoring area at an interval of a third scanning period by using a ground-based three-dimensional lidar measurement system, and obtain three-dimensional laser data of the first level key monitoring area.

Step 206. Determine, according to three-dimensional laser data of each third scanning period, an area with the three-dimensional deformation greater than a fourth preset threshold in the first level key monitoring area as a second level key monitoring area.

Step 207. Conduct scanning at an interval of a fourth scanning period by using a GNSS, and obtain three-dimensional coordinates of each monitoring particle in the second level key monitoring area.

Step 208. Select, according to the three-dimensional coordinates of each monitoring particle that are obtained in real time, a monitoring particle whose three-dimensional coordinate change speed is greater than a fifth preset threshold as a key monitoring particle.

Step 209. Conduct scanning at an interval of a fifth scanning period by using a micro-core pile to conduct monitoring and early warning on a collapse process in an area where the key monitoring particle is located.

In the present invention, the first scanning period is a day-month time scale, the second scanning period is a hour-day time scale, the third scanning period is a minute-hour time scale, the fourth scanning period is a second-minute time scale, and the fifth scanning period is a milli-second-second time scale.

Step 201 of conducting periodic scanning on a dam in a reservoir area at an interval of a first scanning period by using a UAV photogrammetry system, and obtaining laser point cloud data and oblique image data of the dam in the reservoir area specifically includes: conducting periodic scanning at the interval of the first scanning period by using an airborne lidar of the UAV photogrammetry system to obtain the laser point cloud data of the dam in the reservoir area; and conducting periodic scanning at the interval of the first scanning period by using an airborne oblique photography camera of the UAV photogrammetry system to obtain the oblique image data.

Step 202 of selecting, according to laser point cloud data and oblique image data of each first scanning period, an area with the deformation greater than a first preset threshold and a digital elevation difference greater than a second preset threshold as an encrypted monitoring area specifically includes: fusing the laser point cloud data and the oblique image data of each first scanning period to generate a digital elevation model and a three-dimensional scene of the dam in the reservoir area in each first scanning period; and selecting, according to the digital elevation model and the three-dimensional scene of the dam in the reservoir area in each first scanning period, the area with the deformation greater than the first preset threshold and the digital elevation difference greater than the second preset threshold as the encrypted monitoring area.

According to specific examples provided in the present invention, the present invention discloses the following technical effects:

The present invention provides a dam slope deformation monitoring system and method. The monitoring system monitors an entire dam in a reservoir area by using the UAV photogrammetry system, and determines an area (steep slope) with the relatively large deformation and a relatively large digital elevation difference as an encrypted monitoring area; determines, in the encrypted monitoring area, an area with the larger deformation as a first level key monitoring area by using the ground-based radar interferometry measurement system; determines, in the first level key monitoring area, an area with the larger deformation as a second level key monitoring area by using the ground-based three-dimensional lidar measurement system; determines, in the second level key monitoring area, a monitoring particle with a high deformation speed as a key monitoring particle by using the GNSS; and monitors, by using the micro-core pile, a collapse process in an area where the key monitoring particle is located. In the present invention, the UAV photogrammetry system, the ground-based radar interferometry measurement system, the ground-based three-dimensional lidar measurement system, the GNSS, and the micro-core pile are used to conduct time-seamless monitoring from slow deformation to rapid deformation and then to a collapse moment, and monitoring from a large area to a small area and then to a particle and from a two-dimensional (the ground-based radar interferometry measurement system) to three-dimensional (the ground-based three-dimensional lidar measurement system) spatial change. In this way, the precise positioning of a collapsed area of the entire dam in the reservoir area and the precise monitoring of a collapse process can be realized.

According to the system and the dam slope deformation monitoring method in the present invention, a space-air-ground integrated slope monitoring system and a safety early warning method are established, to overcome a disadvantage in conventional slope monitoring that only single-point monitoring can be conducted. Aerial photography is conducted on an entire dam in a reservoir area by using a UAV oblique photogrammetry technology, to complete monitoring of an area with large deformation and a relatively high deformation speed in a wide range of a monitoring reservoir area, three-dimensional displacement of a slope, and dangerous rocks, steep walls, and cracks. The ground-based radar interferometry technology and the ground-based three-dimensional laser scanning technology are used to monitor a two-dimensional displacement change of a ground surface of a slope body in a wide-range area at a slow deformation stage, deformation rates at different stages in a line-of-sight direction, and three-dimensional displacement data of the ground surface of the slope body in the wide-range area at a rapid deformation stage. A high time resolution, high-precision point, and large-scale three-dimensional deformation of a key area of a monitoring area is monitored by using the GNSS system. In this way, a monitoring process of the slope from slow deformation to rapid deformation is completed. Finally, the micro-core pile (micro-core ball) is used to monitor a key area of the monitored slope and a slope area that is quite prone to collapse, to complete, during slow slope deformation to rapid slope deformation, monitoring of a collapse moment of some areas of the slope during rapid deformation. According to the space-air-ground integrated slope monitoring system, dynamic description of a full process from slow slope deformation-rapid deformation-collapse is mainly realized. Based on this, a slope deformation and geological disaster mechanism process and a prediction and early warning model can be established to realize real-time monitoring, prediction, and early warning of geological disasters such as slope deformation and landslides. This is of great significance for slope monitoring and safety early warning.

Each example of the present specification is described in a progressive manner, and each example focuses on the difference from other examples. For the same and similar parts between the examples, mutual reference may be made. For a system disclosed in the examples, since the system corresponds to the method disclosed in the examples, the description is relatively simple. For related content, reference can be made to the method description.

The principles and implementations of the present invention have been described with reference to specific examples. The description of the above examples is only for facilitating understanding of the method and the core idea of the present invention, and the described examples are only some but not all of the examples of the present invention. All other examples obtained by persons of ordinary skill in the art based on the examples of the present invention without creative efforts shall fall within the protection scope of the present invention.

What is claimed is:

1. A dam slope deformation monitoring system, wherein the monitoring system comprises:

an unmanned aerial vehicle (UAV) photogrammetry system, a ground-based radio detection and ranging (RADAR) interferometry measurement system, a ground-based three-dimensional light detection and ranging (LIDAR) measurement system, a global navigation satellite system (GNSS), a plurality of micro-core piles, and a monitoring center, wherein the UAV photogrammetry system, the ground-based radar interferometry measurement system, the ground-based three-dimensional lidar measurement system, the GNSS, and the plurality of micro-core piles each are connected with the monitoring center in a wired or wireless manner;

the UAV photogrammetry system is configured to: conduct periodic scanning on a dam in a reservoir area at an interval of a first scanning period to obtain laser point cloud data and oblique image data of the dam in the reservoir area, and send the laser point cloud data and the oblique image data of the dam in the reservoir area to the monitoring center;

the monitoring center is configured to fuse the laser point cloud data and the oblique image data of the dam in the reservoir area of each first scanning period to generate a digital elevation model and a three-dimensional scene of the dam in the reservoir area in each first scanning period, and select, according to the digital elevation model and the three-dimensional scene of the dam in the reservoir area in each first scanning period, an area with a deformation greater than a first preset threshold and a digital elevation difference greater than a second preset threshold as an encrypted monitoring area;

the ground-based radar interferometry measurement system is disposed in the encrypted monitoring area, and is configured to scan the encrypted monitoring area at an interval of a second scanning period to obtain interferometric synthetic aperture radar (InSAR) data of the encrypted monitoring area, and send the InSAR data to the monitoring center;

the monitoring center is further configured to determine, according to InSAR data of each second scanning period, an area with a deformation greater than a third preset threshold in the encrypted monitoring area as a first level key monitoring area;

the ground-based three-dimensional lidar measurement system is configured to scan the first level key monitoring area at an interval of a third scanning period, obtain three-dimensional laser data of the first level key monitoring area, and send the three-dimensional laser data of the first level key monitoring area to the monitoring center;

the monitoring center is further configured to determine, according to the three-dimensional laser data of the first level key monitoring area of each third scanning period, an area with the three-dimensional deformation greater than a fourth preset threshold in the first level key monitoring area as a second level key monitoring area;

the GNSS is disposed in the second level key monitoring area, and is configured to conduct scanning at an interval of a fourth scanning period, obtain three-dimensional coordinates of each monitoring particle in the second level key monitoring area, and send the three-dimensional coordinates of each monitoring particle to the monitoring center;

the monitoring center is further configured to select, according to the three-dimensional coordinates of each monitoring particle that are obtained in real time, a monitoring particle whose three-dimensional coordinate change speed is greater than a fifth preset threshold as a key monitoring particle; and the plurality of micro-core piles are disposed at the key monitoring particle, and are configured to conduct scanning at an interval of a fifth scanning period to conduct monitoring and early warning on a collapse process in an area where the key monitoring particle is located.

2. The dam slope deformation monitoring system according to claim 1, wherein the first scanning period is a day-month time scale, the second scanning period is a hour-day time scale, the third scanning period is a minute-hour time scale, the fourth scanning period is a second-minute time scale, and the fifth scanning period is a milli-second-second time scale.

3. The dam slope deformation monitoring system according to claim 1, wherein the ground-based radar interferometry measurement system comprises a mobile bracket, an interferometric radar platform, an interferometric radar support base, a first drive motor, a second drive motor, and a third drive motor, wherein the first drive motor is fastened on the mobile bracket, and is configured to drive two driving wheels on the mobile bracket; the second drive motor is fastened on the mobile bracket, output shafts at both ends of the second drive motor are connected with the interferometric radar support base through a bearing shaft on the mobile bracket, and the second drive motor is configured to drive the interferometric radar support base to swing up and down, so as to drive the interferometric radar platform to swing up and down; and the third drive motor is fastened on the interferometric radar support base, an output shaft of the third drive motor is in shaft connection with the interferometric radar platform, and the third drive motor is configured to drive the interferometric radar platform to circumferentially rotate.

4. The dam slope deformation monitoring system according to claim 3, wherein the mobile bracket comprises the two driving wheels and two driven wheels, and the two driven wheels are universal wheels.

5. The dam slope deformation monitoring system according to claim 1, wherein the UAV photogrammetry system comprises a UAV monitoring terminal, a UAV platform, an airborne oblique photography camera, and an airborne lidar;

the UAV monitoring terminal is in wireless connection with all the UAV platform, the airborne oblique photography camera, and the airborne lidar; and the UAV monitoring terminal is further connected with the monitoring center.

6. A dam slope deformation monitoring method, wherein the monitoring method comprises the following steps:

conducting periodic scanning on a dam in a reservoir area at an interval of a first scanning period by using an unmanned aerial vehicle (UAV) photogrammetry system to obtain laser point cloud data and oblique image data of the dam in the reservoir area;

selecting, according to the laser point cloud data and the oblique image data of the dam in the reservoir area of each first scanning period, an area with a deformation greater than a first preset threshold and a digital elevation difference greater than a second preset threshold as an encrypted monitoring area;

scanning the encrypted monitoring area at an interval of a second scanning period by using a ground-based radio detection and ranging (RADAR) interferometry measurement system to obtain interferometric synthetic aperture radar (InSAR) data of the encrypted monitoring area;

determining, according to InSAR data of each second scanning period, an area with a deformation greater than a third preset threshold in the encrypted monitoring area as a first level key monitoring area;

scanning the first level key monitoring area at an interval of a third scanning period by using a ground-based three-dimensional light detection and ranging (LIDAR) measurement system, and obtaining three-dimensional laser data of the first level key monitoring area;

determining, according to the three-dimensional laser data of the first level key monitoring area of each third scanning period, an area with the three-dimensional deformation greater than a fourth preset threshold in the first level key monitoring area as a second level key monitoring area;

conducting scanning at an interval of a fourth scanning period by using a global navigation satellite system (GNSS), and obtaining three-dimensional coordinates of each monitoring particle in the second level key monitoring area;

selecting, according to the three-dimensional coordinates of each monitoring particle that are obtained in real time, a monitoring particle whose three-dimensional coordinate change speed is greater than a fifth preset threshold as a key monitoring particle; and conducting scanning at an interval of a fifth scanning period by using a plurality of micro-core piles to conduct monitoring and early warning on a collapse process in an area where the key monitoring particle is located.

7. The dam slope deformation monitoring method according to claim 6, wherein the first scanning period is a day-month time scale, the second scanning period is a hour-day time scale, the third scanning period is a minute-hour time scale, the fourth scanning period is a second-minute time scale, and the fifth scanning period is a millisecond-second time scale.

8. The dam slope deformation monitoring method according to claim 6, wherein the conducting periodic scanning on the dam in the reservoir area at the interval of the first scanning period by using a UAV photogrammetry system to obtain the laser point cloud data and the oblique image data of the dam in the reservoir area specifically comprises:

conducting periodic scanning at the interval of the first scanning period by using an airborne lidar of the UAV photogrammetry system to obtain the laser point cloud data of the dam in the reservoir area; and conducting periodic scanning at the interval of the first scanning period by using an airborne oblique photography camera of the UAV photogrammetry system to obtain the oblique image data.

9. The dam slope deformation monitoring method according to claim 6, wherein the selecting, according to the laser point cloud data and the oblique image data of the dam in the reservoir area of each first scanning period, the area with the deformation greater than the first preset threshold and the digital elevation difference greater than the second preset threshold as the encrypted monitoring area specifically comprises:

fusing the laser point cloud data and the oblique image data of each first scanning period to generate a digital elevation model and a three-dimensional scene of the dam in the reservoir area in each first scanning period; and selecting, according to the digital elevation model and the three-dimensional scene of the dam in the reservoir area in each first scanning period, the area with the deformation greater than the first preset threshold and the digital elevation difference greater than the second preset threshold as the encrypted monitoring area.

\* \* \* \* \*